United States Patent
Wood et al.

(10) Patent No.: US 11,980,513 B2
(45) Date of Patent: May 14, 2024

(54) DETERMINING SPATIAL RELATIONSHIP BETWEEN UPPER TEETH AND FACIAL SKELETON

(71) Applicant: Mimetrik Solutions Limited, Leeds (GB)

(72) Inventors: David John Wood, Leeds (GB); Cecilie Anneth Osnes, Leeds (GB); Andrew James Keeling, Leeds (GB)

(73) Assignee: Mimetrik Solutions Limited, Leeds (GB)

( * ) Notice: Subject to any disclaimer, the term of this patent is extended or adjusted under 35 U.S.C. 154(b) by 221 days.

(21) Appl. No.: 17/783,189

(22) PCT Filed: Dec. 8, 2020

(86) PCT No.: PCT/GB2020/053142
§ 371 (c)(1),
(2) Date: Jun. 7, 2022

(87) PCT Pub. No.: WO2021/116671
PCT Pub. Date: Jun. 17, 2021

(65) Prior Publication Data
US 2023/0009652 A1    Jan. 12, 2023

(30) Foreign Application Priority Data
Dec. 9, 2019 (GB) ...................... 1918008

(51) Int. Cl.
*G06T 17/00* (2006.01)
*A61C 9/00* (2006.01)
(Continued)

(52) U.S. Cl.
CPC ............ *A61C 13/34* (2013.01); *A61C 9/0006* (2013.01); *G06T 7/70* (2017.01); *G06T 17/00* (2013.01);
(Continued)

(58) Field of Classification Search
None
See application file for complete search history.

(56) References Cited

U.S. PATENT DOCUMENTS

2014/0379356 A1    12/2014 Sachdeva et al.

FOREIGN PATENT DOCUMENTS

| EP | 3453333 A1 | 3/2019 |
| GB | 1913469.1 | 10/2019 |

(Continued)

OTHER PUBLICATIONS

Rosati et al., Digital dental cast placement in 3-dimensional full-face reconstruction: A technical evaluation, Jul. 31, 2010 84-88 (Year: 2010).*

(Continued)

*Primary Examiner* — Robert J Craddock
(74) *Attorney, Agent, or Firm* — Downs Rachlin Martin PLLC

(57) ABSTRACT

A computer-implemented method includes receiving a 3D model representative of upper teeth (U1) of a patient (P) and receiving a plurality of images of a face of the patient (P). The method also includes generating a facial model (200) of the patient based on the received plurality of images and determining, based on the determined facial model (200), the received 3D model of 10 the upper teeth (U1) and the plurality of images, a spatial relationship between the upper teeth (U1) of the patient (P) and a facial skeleton of the patient (P).

14 Claims, 13 Drawing Sheets

(51) Int. Cl.
*A61C 13/34* (2006.01)
*G06T 7/70* (2017.01)
*G06V 10/44* (2022.01)

(52) U.S. Cl.
CPC .... *G06V 10/44* (2022.01); *G06T 2207/30036* (2013.01)

(56) References Cited

FOREIGN PATENT DOCUMENTS

| WO | 2008128700 A1 | 10/2008 |
| WO | 2009140582 A2 | 11/2009 |
| WO | 2011103876 A1 | 9/2011 |
| WO | 2018154154 A1 | 8/2018 |
| WO | 2018175486 A1 | 9/2018 |

OTHER PUBLICATIONS

Hartley, R. and Zisserman, A., "Multiple view geometry in computer vision." Cambridge University Press, 2003.
Wu, Yue, and Qiang Ji. "Facial Landmark Detection: A Literature Survey." International Journal of Computer Vision 127.2 (May 2018).
4dface. 3D face models & reconstruction (http://www.4dface.io/) (Last viewed on Jun. 7, 2022).
Fischler, M.A. and Bolles, R.C., "Random sample consensus: a paradigm for model fitting with applications to image analysis and automated cartography." Communications of the ACM, vol. 24(6), pp. 381-395, Jun. 1981.

* cited by examiner

DETERMINING SPATIAL RELATIONSHIP BETWEEN UPPER TEETH AND FACIAL SKELETON

FIELD

The present invention relates to a computer-implemented method of determining a spatial relationship between the upper teeth and facial skeleton, and a system to determine a spatial relationship between the upper teeth and facial skeleton.

BACKGROUND

It is often important in dentistry to record the relationship between the upper teeth and the skull. Factors such as appearance and function of the teeth can be affected by their relationship between the upper teeth and the skull, or more particularly the facial skeleton. For example, the teeth themselves may be straight, but display an unattractive alignment with respect to the eyeline if the alignment between the teeth and skull is not accounted for. Such issues may be exacerbated in instances where the patient has heavily worn teeth. By relating the upper teeth to the skull it can be ensured that, when dental prosthetics are fabricated, the occlusal planes, midlines and occlusal vertical dimension remain in harmony with the face.

Traditionally, a facebow or earbow is used to capture the relationship between the upper teeth and the skull, which is then transferred to a dental articulator having attached thereto stone models of the upper teeth and lower teeth. Despite being an element of most dental training programmes, facebows are rarely used in general dentistry because they are complex, expensive and prone to error.

It is an aim of the disclosure to overcome the above-mentioned difficulties, and any other difficulties that may be apparent to the skilled reader for the description herein. It is a further aim of the disclosure to provide a cost-effective and accurate means of determining the relationship between the upper teeth and the facial skeleton.

SUMMARY

According to the present invention there is provided an apparatus and method as set forth in the appended claims. Other features of the invention will be apparent from the dependent claims, and the description which follows.

According to a first aspect of the disclosure there is provided a computer-implemented method comprising:
  receiving a 3D model representative of upper teeth of a patient;
  receiving a plurality of images of a face of the patient;
  generating a facial model of the patient based on the received plurality of images;
  determining, based on the determined facial model, the received 3D model representative of the upper teeth and the plurality of images, a spatial relationship between the upper teeth of the patient and a facial skeleton of the patient.

Determining the spatial relationship between the upper teeth and the facial skeleton may comprise: determining a camera pose with respect to the facial model, and determining optimal alignment of the images to the 3D model representative of the upper teeth based on the camera pose.

Determining the optimal alignment may comprise, for each of the images: rendering a 3D scene based on the camera pose at which the image was captured and an estimated spatial relationship between the 3D model representative of the upper teeth of a patient and the facial model; extracting a 2D rendering from the rendered 3D scene based on the camera pose; comparing the 2D rendering to the image to determine a cost score indicative of a level of difference between the 2D rendering and the image. Determining the optimal alignment may comprise using an optimiser, preferably a non-linear optimiser, to iteratively obtain the optimal alignment over the plurality of images.

The cost score may comprise a mutual information score calculated between the rendering and the image. The cost score may comprise a similarity score of corresponding image features extracted from the rendering and the image. The image features may be corner features. The image features may be edges. The image features may be image gradient features. The similarity score may be one of Euclidian distance, random sampling or one-to-oneness. The rendering and the 2D image may be pre-processed before calculating the mutual information score. A convolution or filter may be applied to the rendering and the 2D image.

The cost score may comprise a closest match score between the 2D rendering and the 2D image. The closest match score may be based a comparison of 2D features from the 2D rendering and 2D features from the 2D image.

The cost score may comprise a 2d-3d-2d-2d cost, calculated by: extracting 2D image features from the rendered 3D scene; re-projecting the extracted features on to the rendered 3D scene; extracting image features from the 2D image; re-projecting the extracted features from the 2D image onto the rendered 3D scene, and calculating a similarity measure indicative of the difference between the re-projected features in 3D space.

The cost score may comprise an optical flow cost, calculated by tracking pixels between consecutive images of the plurality of 2D images. The optical flow cost may be based on dense optical flow. The tracked pixels may exclude pixels determined to be occluded.

Determining the cost score may comprise determining a plurality of different cost scores based on different extracted features and/or similarity measures. The cost scores used in each iteration by the optimiser may differ. The cost scores may alternate between a first selection of cost scores and a second selection of the cost scores, wherein one of the first and second selection comprises the 2d-3d-2d-2d cost, and the other does not.

The facial model may be a 3D morphable mesh. Generating the facial model may comprise: detecting a plurality of facial landmarks from the images, and fitting the 3D morphable mesh to the facial landmarks. There may be a hole in the 3D morphable mesh at a position corresponding to the mouth of the patient. The hole may aid image segmentation and identification of the upper teeth.

The plurality of images may comprise at least a portion of the upper teeth of the patient. The 3D model representative of the upper teeth may be a 3D model of the upper teeth.

The plurality of images may comprise at least a portion of a marker. The marker may be coupled to an impression tray. The impression tray may be disposed in a mouth of the patient. The marker may be disposed outside the mouth of the patient. The impression tray may be used to capture an impression of the upper teeth. The 3D model representative of the upper teeth may be a 3D model of the impression tray. The 3D model of the impression tray may include the marker. The 3D model of the impression tray may not include the marker, and the spatial relationship between the teeth and the facial skeleton may be determined based on a predetermined spatial relationship between the marker and the impression tray. Further optional features of the impression tray are defined hereinbelow with reference to the fifth aspect, and may be combined with the first aspect in any combination.

The plurality of images may comprise a first set of images and a second set of images.

The first set of images may be used to generate the 3D model of the face. The second set of images each include at least a portion of the upper teeth of the patient P, and may be used to determine the spatial relationship between the upper teeth and the facial skeleton. The second set of images each include at least a portion of the marker, and may be used to determine the spatial relationship between the upper teeth and the facial skeleton.

Determining the camera pose of an image of the plurality of images may comprise: morphing the 3D morphable mesh to match an expression shown in the image, and determining the camera pose based on the morphed 3D morphable mesh. The images and/or the 2D rendering may be masked using the expression-fitted face model.

According to a second aspect of the disclosure there is provided a system comprising a processor and a memory. The memory stores instructions that, when executed by the processor, cause the system to perform any of the methods set forth herein.

According to a third aspect of the disclosure there is provided a tangible non-transient computer-readable storage medium is provided having recorded thereon instructions which, when implemented by a computer device, cause the computer device to be arranged as set forth herein and/or which cause the computer device to perform any of the methods set forth herein.

According to a fourth aspect of the disclosure there is provided a computer program product comprising instructions, which when the program is executed by a computer, cause the computer to carry out any of the methods set forth herein.

According to a fifth aspect of the disclosure there is provided a dental impression tray, comprising:
  a body configured to retain an impression material, and
  a marker portion coupled to the body and configured to be disposed outside a mouth of the patient when the body is received in the mouth of the patient, the marker portion comprising a marker.

The dental impression tray may be suitable for use in restorative and/or orthodontic dentistry. The body may comprise a recess sized to retain a sufficient volume of impression material to capture an impression for use in restorative dentistry. The dental impression tray may be configured to capture a full-arch impression. The dental impression tray may be single-sided. The dental impression tray may be configured to capture an impression of a single arch of the patient's teeth, preferably the upper teeth.

The dental impression tray may comprise a handle extending from the body, wherein the marker portion is disposed on the handle. The marker portion may be disposed at a distal end of the handle.

The marker portion may comprise a plurality of marker sections, each marker section comprising a marker. The marker portion may comprise a pair of marker sections extending laterally from opposing sides of the handle.

The marker portion may comprise a planar section, on which the marker is formed. The planar section may be arranged in a substantially vertical plane when the body is disposed in the mouth of the patient.

The marker portion, suitably the handle comprising the marker portion, may be detachable from the body. The marker portion, suitably the handle comprising the marker portion, may be integrally formed with the body.

The marker may comprise a visually distinctive pattern.

According to a sixth aspect of the disclosure there is provided a marker handle for a dental impression tray, the handle comprising:
  an attachment portion configured to attach to a body of a dental impression tray, and
  a marker portion configured to be disposed outside a mouth of the patient when the body is received in the mouth of the patient, the marker portion comprising a marker.

Further preferred features of the marker handle are defined above in relation to the fifth aspect, and may be combined in any combination.

BRIEF DESCRIPTION OF DRAWINGS

For a better understanding of the invention, and to show how examples of the same may be carried into effect, reference will now be made, by way of example only, to the accompanying diagrammatic drawings in which.

Figure 1:
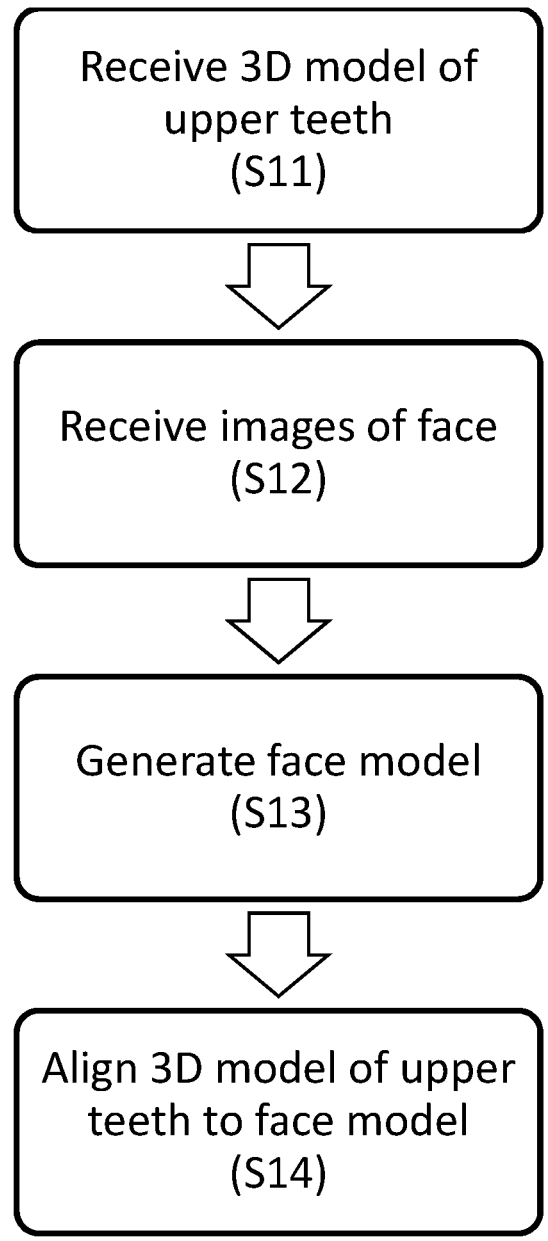
FIG. 1 is a schematic flowchart of a first example method of determining a spatial relationship between the upper teeth and the facial skeleton of a patient.

In the drawings, corresponding reference characters indicate corresponding components. The skilled person will appreciate that elements in the figures are illustrated for simplicity and clarity and have not necessarily been drawn to scale. For example, the dimensions of some of the elements in the figures may be exaggerated relative to other elements to help to improve understanding of various example examples. Also, common but well-understood elements that are useful or necessary in a commercially feasible example are often not depicted in order to facilitate a less obstructed view of these various example examples.

DESCRIPTION OF EMBODIMENTS

In overview, examples of the disclosure provide a means of determining a spatial relationship between the upper teeth and the facial skeleton based on a plurality of 2D images of the face and a 3D model of the upper teeth derived from a 3D scan. The plurality of 2D images may be used to align a 3D model of the upper teeth with a 3D model of the face generated from the 2D images. In some examples, the plurality of 2D images comprise a video captured by a camera moving around the face of the patient.

FIG. 1 illustrates an example method of determining the spatial relationship between the upper teeth and the facial skeleton.

In block S11, a 3D model is received of a patient's upper teeth. The 3D model of the upper may be obtained using a suitable 3D dental scanner. For example, the dental scanner described in the applicant's pending UK patent application GB1913469.1, may be used. The dental scanner may be used to scan impressions taken from the upper teeth, stone models cast from the impression, or a combination of impressions and stone models.

In further examples, the 3D model may be obtained by other commercially available scanners, which may either scan stone models or take the form of intra-oral scanners suitable for placement in a patient's mouth.

The 3D model may take the form of a data file in the STL or PLY format, or any other data format suitable for storing a 3D model.

In block S12, a plurality of 2D images of the face of the patient are received.

Figure 2:
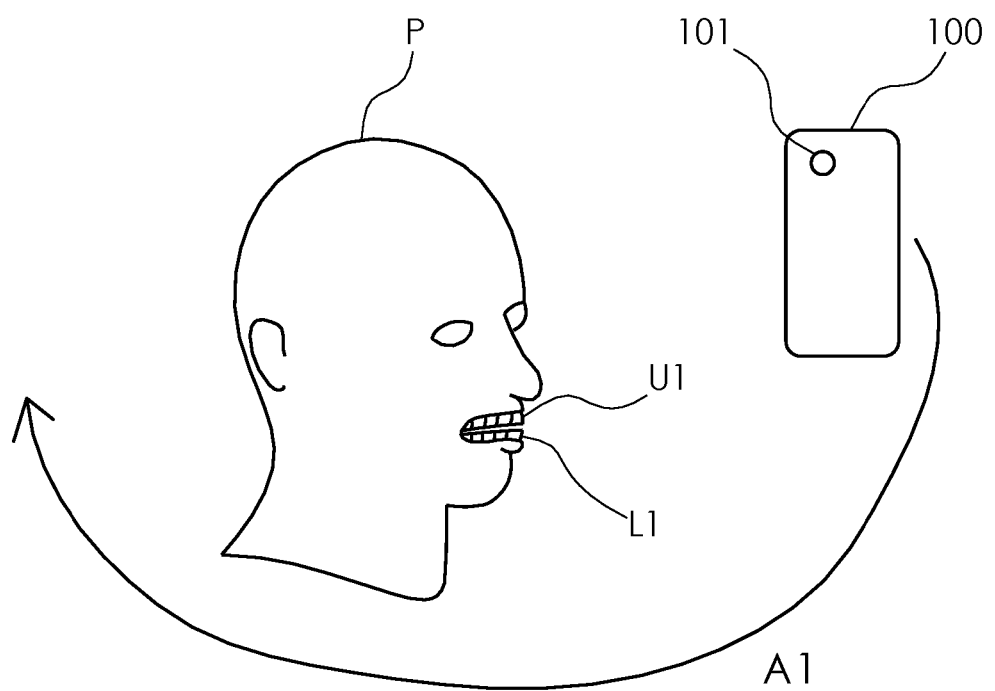
FIG. 2 is a schematic perspective illustrating an example method of capturing 2D images of the patient.

FIG. 2 illustrates an example method of capturing the images. As shown in FIG. 2, the images may be captured by a single camera 101, which may for example be a camera of a smartphone 100. The camera 101 may be placed in a video capture mode, such that it captures images at a predetermined frame rate. The camera 101 is then moved in an arc A1 around the face of a patient P. The upper teeth U1 of the patient P are at least partially visible to the camera, because the patient P is holding apart their lips, or other standard dental lip retraction methods are employed. In the example of FIG. 2, the lower teeth L2 are also visible, though this is not necessary for the methods described herein. Accordingly, a plurality of images are captured, each image comprising at least a portion of the upper teeth U1 of the patient P.

Whilst the example of FIG. 2 illustrates a camera 101 of a smartphone 100, any suitable camera may be employed.

In one example, the camera 101 is calibrated before capturing the 2D images. Particularly, the camera 101 may undergo a calibration process in order to determine, or estimate, the parameters of the lens and image sensor of the camera 101, so that these parameters can be used to correct for phenomena such as lens distortion and barrelling (also referred to as radial distortion), allowing for accurate 3D scene reconstruction. The calibration process may also determine the focal length and optical centre of the camera 101. The calibration process may involve capturing images of an object with known dimensions and geometry, and estimating the parameters of the lens and image sensor based thereon. Example methods of calibrating the camera may be as described in Hartley, R. and Zisserman, A., 2003. *Multiple view geometry in computer vision*. Cambridge university press, the contents of which are incorporated herein by reference.

In block S13, a 3D model of the face of the patient P is generated. In one example, all of the captured images are passed to an optimiser, which fits a single face model to all of the images. The face model may be a 3D morphable mesh.

Figure 3:
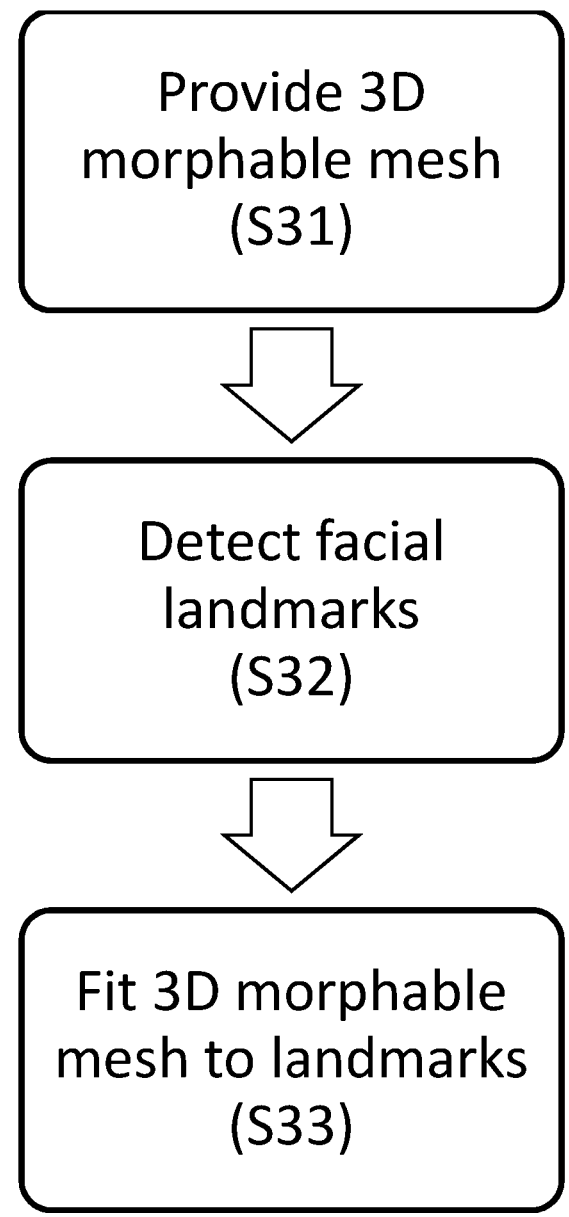
FIG. 3 is a schematic flowchart illustrating the example method of FIGS. 1 and 2 in more detail.

This is described in more detail with reference to FIG. 3.

In block S31, a 3D morphable mesh is provided. The 3D morphable mesh is a general model of the face, for example derived by performing dimensionality reduction such as principal component analysis on a training set of facial meshes derived from 3D scans of a plurality of faces. In one example, a mesh having between 20 and 50 principal components is used, though the number may be varied.

In block S32, a plurality of facial landmarks are detected from the images. The facial landmarks may be detected using a trained neural network or other machine-learned landmark detector. Example landmark detection methods include those set out in Wu, Yue, and Qiang Ji. "*Facial Landmark Detection: A Literature Survey.*" International Journal of Computer Vision 127.2 (2018): 115-142, the contents of which are incorporated by reference.

Figure 4:
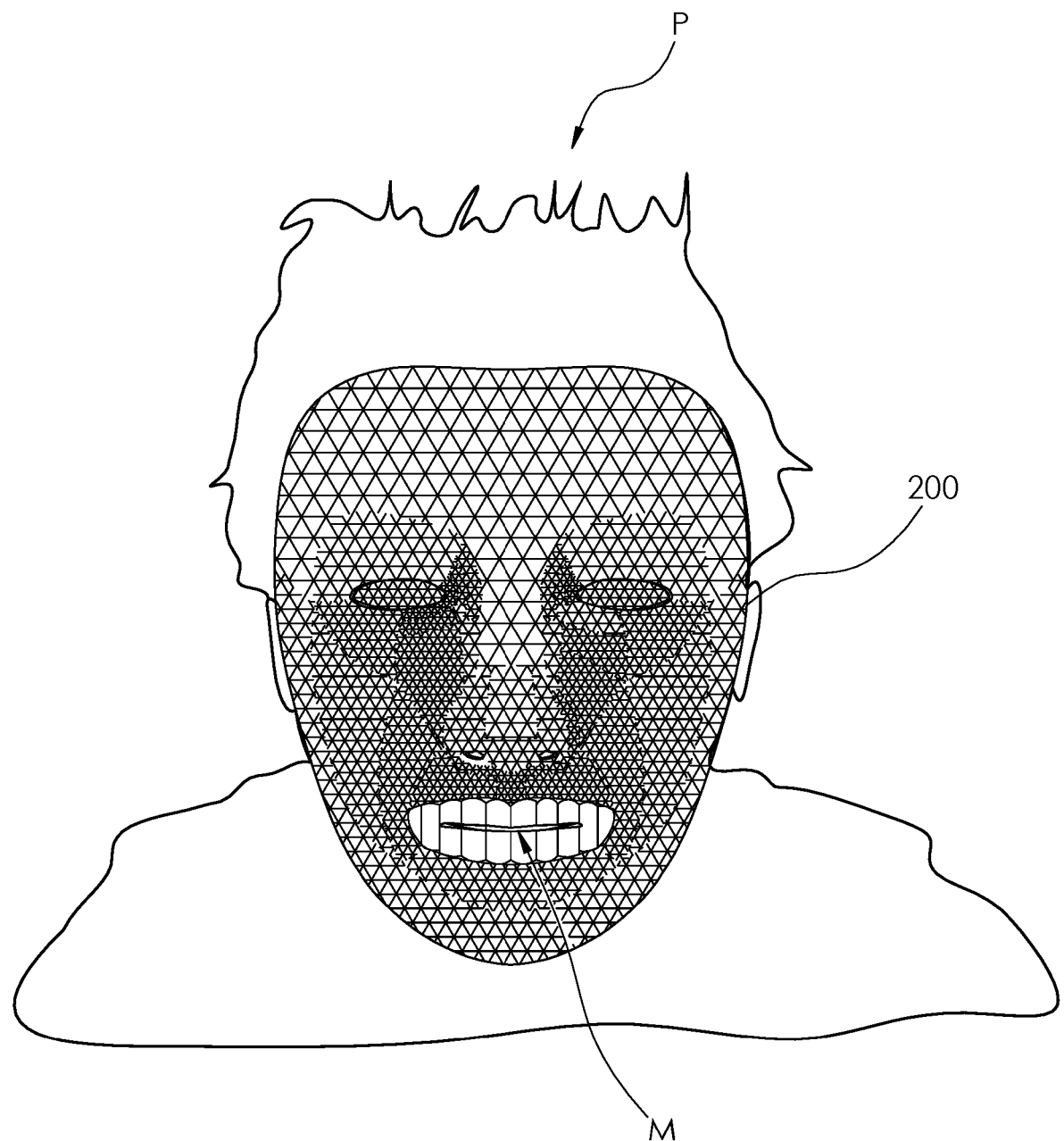
FIG. 4 is an image of an example face of a patient with a 3D face model fitted thereto.

In block S33, the 3D morphable mesh is fitted to the landmarks, such that a patient-specific 3D model of the face is generated. This may involve deriving the values of deviations from the mean for each of the principal components, for example using a face-fitting algorithm FIG. 4 shows an example 3D morphable mesh 200 fitted to the face of the patient P. The 3D morphable mesh may not cover the intra-oral area. That is to say, there may be a hole in the mesh 200 at a position corresponding to the mouth M of the patient P.

It will be appreciated that other face fitting techniques may be employed, which may for example rely on texture information of the face in addition to landmarks. Furthermore, in other examples, the 3D model may also fit textures to the 3D morphable mesh.

In one example, the morphable mesh and fitting techniques may be based on those available as part of the 4dface toolkit (http://www.4dface.io/).

In one example, the plurality of images comprises a first set of images and a second set of images. The first set of images, which may be a first captured video, each show the face of the patient P, but may or may not include the upper teeth U1. The first set of images may then be used to generate the 3D model of the face. The second set of images, which may be a second captured video, each include at least a portion of the upper teeth U1 of the patient P. The second set of images may then be used to align the 3D model of upper teeth U1 to the face model. However, in other examples, a single set of images (e.g. a single video) may be used in the generation of the 3D model of the face and the subsequent alignment of the upper teeth U1 to the face model.

Returning to FIG. 1, in block S14, the spatial alignment of the upper teeth with respect to the 3D model of the face is determined. The method of aligning the upper teeth with respect to the 3D model of the face will be discussed in detail below with reference to FIG. 5-7.

Figure 5:
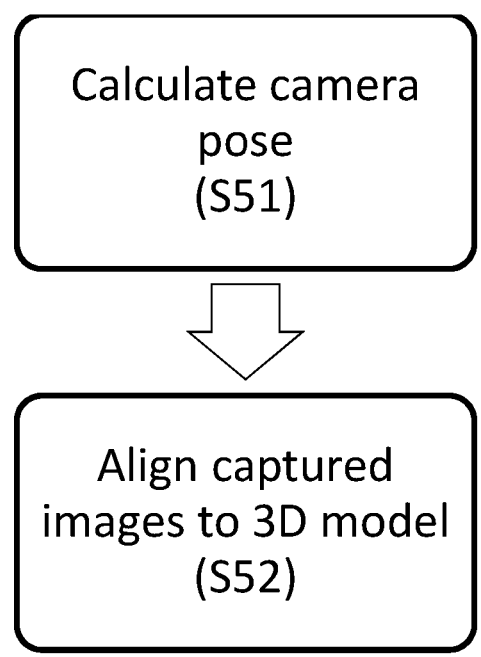
FIG. 5 is a schematic flowchart illustrating the example method of FIG. 1-4 in more detail.

FIG. 5 illustrates the process of block S14 of FIG. 1 in more detail.

In block S51, the camera pose with respect to the face, and the expression of the face, is calculated for each of the captured images. Particularly, for each of the images, the 3D morphable mesh is morphed to match the expression shown in the image. The camera pose is then derived based on the 3D morphable mesh. Particularly, because the parameters of the camera 101 (e.g. focal length, optical centre) are known, and the 3D shape of the mesh in the expression shown in the image is known, the location of the camera at the time the image was taken can be derived, for example as described in *Multiple view geometry in computer vision*, as referenced above.

In block S52, the captured images showing at least a portion of the upper teeth U1 are aligned to the 3D model of upper teeth to the 3D model of the face. The transformation T to align the upper teeth U1 to the face model is optimised simultaneously over all of, or a subset of, the captured 2D images. As each image necessarily shows the upper teeth in the same spatial relationship to the face model, the captured images are effectively the same relationship shown from a plurality of different viewpoints. Accordingly, an alignment is derived which provides the best fit over all of the captured images.

Figure 6:
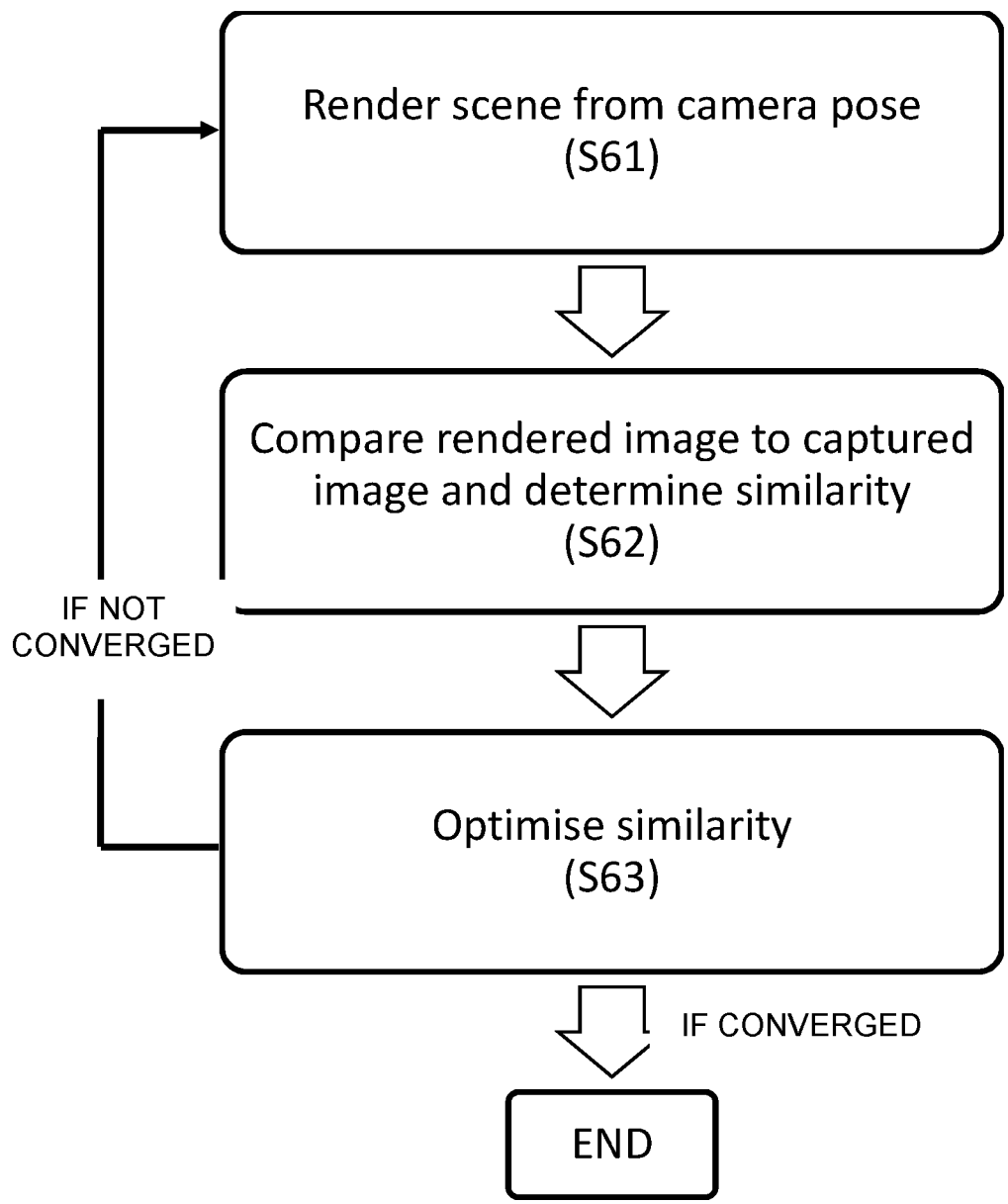
FIG. 6 is a schematic flowchart illustrating the example method of FIG. 1-5 in more detail.
Figure 7:
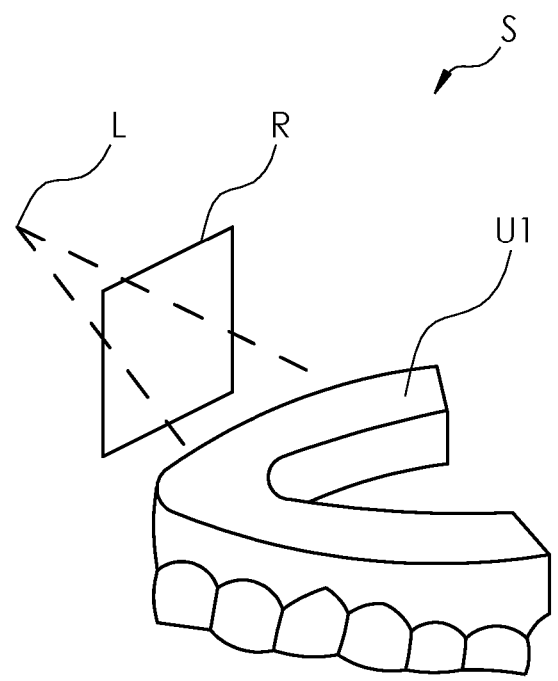
FIG. 7 is a schematic diagram illustrating the example method of FIG. 1-6 in more detail.
Figure 7:
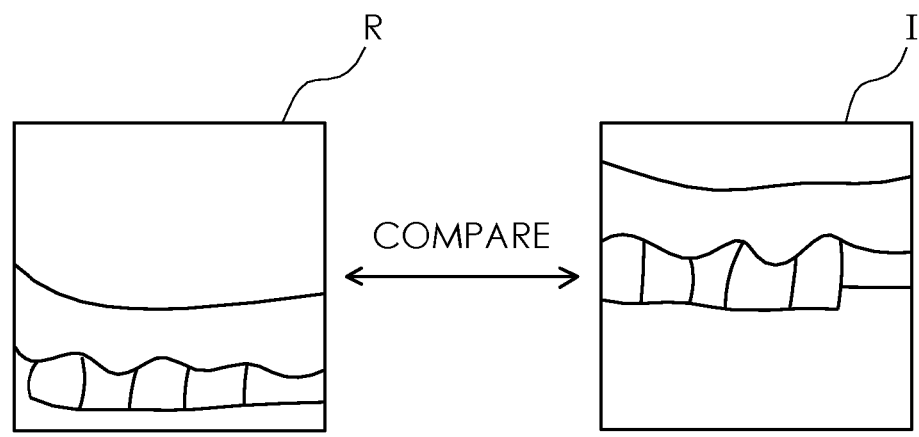

The method of aligning the 3D model of the upper teeth with the captured images will now be described with reference to FIGS. 6 and 7.

In block S61, a 3D rendering of the scene S is carried out based on the current estimation of the camera pose C and the model U1 pose. This results in a 2D rendered image R of the current estimate of the scene, as viewed from the estimate of the camera position C.

In block S62, the rendered image R is compared to the 2D captured image I, so as to score the current estimate of the model pose and camera pose. The higher the degree of similarity between the captured image and the rendered image I, the greater the likelihood that the estimate is correct.

In order to assess the similarity of the rendered image R and the captured image I, a similarity metric may be calculated. The metric may output a cost score, wherein a higher cost score indicates a higher degree of difference between the rendered image R and the captured image I. In some examples, the images I and R can be automatically masked using the expression-fitted face model, so that only the intra-oral area is considered in the cost score.

In one example, a mutual information (MI) score is calculated between the rendered image R and the captured image I. The MI may be calculated based directly on the rendered image R and the captured image I. However, in further examples, the rendered image R and captured image I may be processed in different ways before the calculation of the MI, to enhance the effectiveness of the MI score. For example, a filter such as Sobel gradient processing, or another image convolution, either machine-learnt or designed, may be applied to the rendered image R and the captured image I.

In one example, feature extraction is carried out on each of the rendered image R and the captured image I, so as to extract salient features (e.g. regions or patches) therefrom. For example, an edge extraction method is applied to extract edge points or regions from each of the rendered image R and the captured image I. In another example, a corner extraction method is applied to extract corner points or regions from each of the rendered image R and the captured image I. In further examples, other features may be extracted. For example, image-gradient features or other machine-learned salient features, for example learned with a convolutional neural network, may be extracted.

Corresponding salient features respectively extracted from the rendered image R and the captured image I are then matched, to determine the similarity therebetween. For example, the matching may employ a similarity measure such as the Euclidean distance between the extracted points, random sampling of the extracted points as discussed in Fischler, M. A. and Bolles, R. C., 1981. Random sample consensus: a paradigm for model fitting with applications to image analysis and automated cartography. *Communications of the ACM,* 24(6), pp. 381-395, or measures such as one-to-oneness.

In a further example, a cost referred to herein as a 2d-3d-2d-2d cost is calculated as follows.

Firstly, 2D features (edges/corners/machine-learnt or human-designed convolutions) are extracted from the 2D image R of the current 3D render guess, which results in a point set A2. Next, those 2D features are re-projected back onto the 3D render to give a set of 3D points (point set A3).

In the 2D camera image I, corresponding 2D features are extracted (point set B2). Next correspondences are assigned between B2 and A2, generally using a closest point search, but this may be augmented with a closest similarity factor too. Subsequently, the equivalent 3D correspondences (A3) are calculated, resulting in a set of 2D-3D correspondences B2-A3. Now the task is to minimize the 2D reprojection error of points A3 (referred to as A2'), by optimising the camera or model pose, such that B2-A2' is minimized.

Conceptually this score involves marking edge points (or other salient points) on the 3D model, finding the closest edge points on the 2D camera image, then moving the model so that the reprojection of those 3D edge points coincides with the 2D image points.

The whole process is then repeated iteratively because in each iteration, the edge points marked on the 3D model, and their corresponding camera-image 2D points are increasingly likely to be genuine correspondences.

A further cost is to extract 2d features from the rendered image R (which again, may be pre-processed, for example using a silhouette render) and the 2d features from the camera image.

The closest matches between the two images are found and then used as a current cost score, which is directly fed-back to the optimiser, which may then adjust the model (or camera) pose a little and recalculate the render. This method differs from the 2d-3d-2d-2d cost in that the correspondences are updated every iteration, with the correspondence distances being used as a score to guide the optimiser, whereas the 2d-3d-2d-2d cost is calculated by iterating to minimise the current set of correspondences (i.e. an inner loop), then recalculating the render, then getting new correspondences and iterate around again (outer loop).

Another cost score may be calculated using optical flow. Optical flow techniques track pixels between consecutive frames in a sequence. As the frames are consecutively recorded, if the tracked position of a pixel in the rendered image R is significantly different to the tracked position of the pixel in the captured image I, it is an indication that the estimate of the model and camera pose is inaccurate.

In one example, the optical flow prediction is carried out forwards, i.e. based on the preceding frames of the captured video. In one example, the optical flow prediction is carried out backwards, in that the order of the frames of the video is reversed such that the optical flow prediction based on succeeding frames may be calculated.

In one example, a dense optical flow technique is employed. The dense optical flow may be calculated for a subset of the pixels in the images. For example, the pixels may be limited to pixels that, based on their position, are assumed to be in a plane substantially orthogonal to a vector extending from the optical centre of the camera. In one example, pixels may be determined to occluded by the face of the patient P (e.g. by the nose), based on the face model fitted to the face. Such pixels may then be no longer tracked by optical flow.

In one example, a plurality of the above-described methods are applied so as to determine a plurality of different cost scores based on different extracted features and/or similarity measures.

The process of block S61 and S62 is carried out for a plurality of the captured images. For example, the process may be carried out for all of the captured images. However, in other examples a subset of the captured images may be chosen. For example, a sub-sample of the captured images may be chosen. The sub-sample may be a regular sub-sample, such as every other captured image, every third captured image or every tenth captured image.

Accordingly, a plurality of cost scores are derived that reflect the similarity between each captured image and its corresponding rendered image based on the estimated position of the model and the estimated position of the camera.

In one example, the difference in the estimated camera pose between consecutive frames may be calculated as an additional cost score. In other words, the distance between the estimated camera pose of the present image and the previously captured frame may be calculated, and/or the distance between the estimated camera pose of the present image and the subsequently captured frame may be calculated. As the images are captured consecutively, large differences in the camera pose between consecutive frames is indicative of an incorrect estimate.

In block S63, the cost scores of each of the images are fed to a non-linear optimiser, which iterates the processes of block S61 and S62, adjusting the camera poses and model poses at each iteration. A solution is arrived at that simultaneously optimises over each of the images. The iteration stops when a convergence threshold has been reached. In one example, the non-linear optimiser employed is the Levenberg—Marquardt algorithm. In other examples, other algorithms may be employed, from software libraries such as Eigen (http://eigen.tuxfamily.org/), Ceres (http://ceres-solver.org/) or nlopt (https://nlopt.readthedocs.io).

In one example, an initial estimate of the position of the 3D model of the teeth with respect to the facial skeleton is provided, for use in the first iteration. For example, an initial estimate of the position may be taken based on a usual or normal position of the teeth, for example a predetermined distance below the lips of the facial model and a predetermined distance back from the lips. In other examples, an initial estimate may be provided by user input, for example by identifying key points of the 3D model in the captured images. Example key points include the tips of the canines and gingival papillae.

In a further example, the cost scores used in each iteration may differ. In other words, a selection of the above-mentioned scores are calculated in each iteration, wherein the selection may differ from iteration to iteration. For example, the method may alternate between a first selection of the above-mentioned scores and a second selection of the above-mentioned scores. In one example, one of the first and second selection comprises the 2d-3d-2d-2d cost, and the other does not. By using a variety of cost metrics in the above-described manner, a more robust solution may be found.

Figure 9:
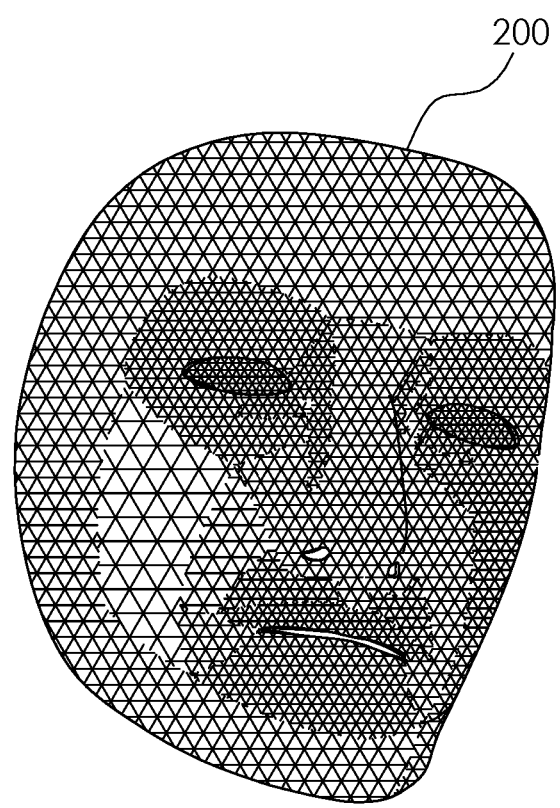
FIG. 9 is an image of an example 3D face model with a 3D model of the upper teeth oriented thereto.

Accordingly, the output is a single 3d transformation, T, which brings the upper teeth 3D model into the correct spatial relationship with the patient-specific face model. An example is shown in FIG. 9.

Based on the transformation T, classic landmarks can be automatically identified such as the ala-tragal line, the midline, and the inter-pupillary line. These can be passed to CAD design software to orientate the upper teeth model U1 correctly in the users choice of digital articulator, or used in conjunction with the patient-specific face model (which can be imported into the CAD software as a OBJ file or similar) to aid in dental design.

Figure 8:
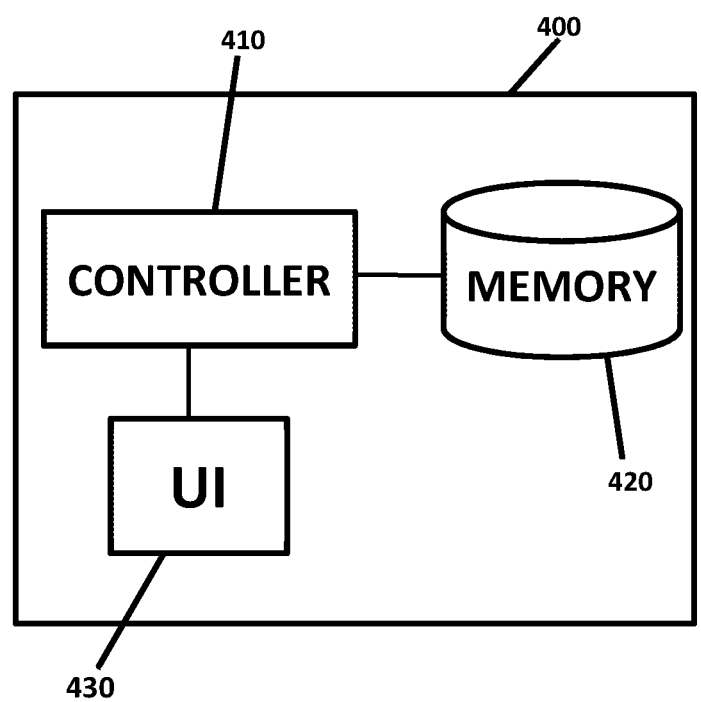
FIG. 8 is a schematic block diagram of an example system for determining a spatial relationship between the upper teeth and the lower teeth of the patient.

FIG. 8 shows an example system 400 for determining the spatial relationship between upper and lower teeth. The system 400 comprises a controller 410. The controller may comprise a processor or other compute element such as a field programmable gate array (FPGA), graphics processing unit (GPU) or the like. In some examples, the controller 410 comprises a plurality of compute elements. The system also comprises a memory 420. The memory 420 may comprise any suitable storage for storing, transiently or permanently, any information required for the operation of the system 400. The memory 420 may comprise random access memory (RAM), read only memory (ROM), flash storage, disk drives and any other type of suitable storage media. The memory 420 stores instructions that, when executed by the controller 410, cause the system 400 to perform any of the methods set out herein. In further examples, the system 400 comprises a user interface 430, which may comprise a display and input means, such as a mouse and keyboard or a touchscreen. The user interface 430 may be configured to display the GUI 300. In further examples, the system 400 may comprise a plurality of computing devices, each comprising a controller and a memory, and connected via a network.

A further example method will now be described with reference to FIGS. 10 and 11.

Figure 10A:
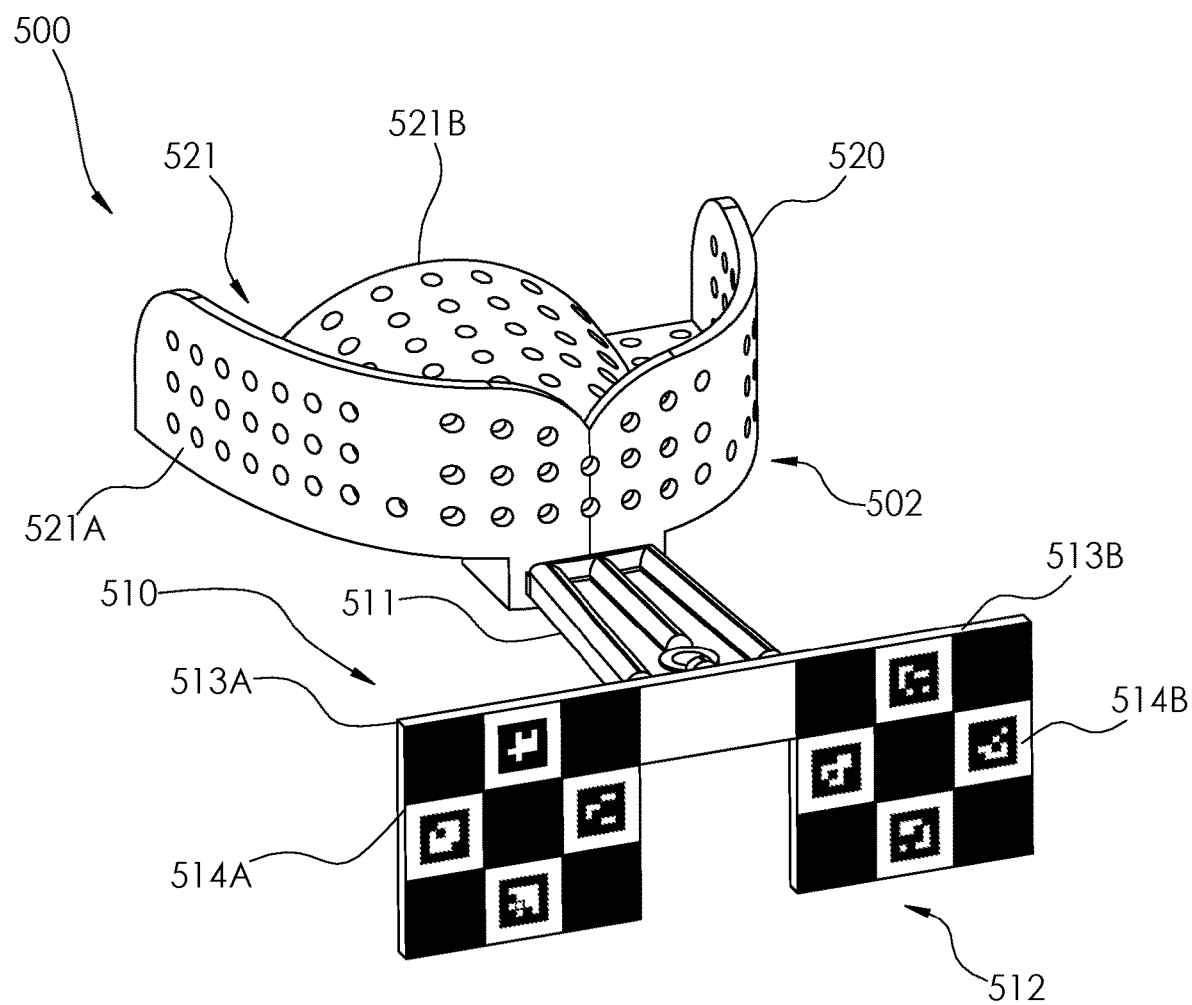
FIG. 10A-C are images of an example dental impression tray and an example marker handle.
Figure 10B:
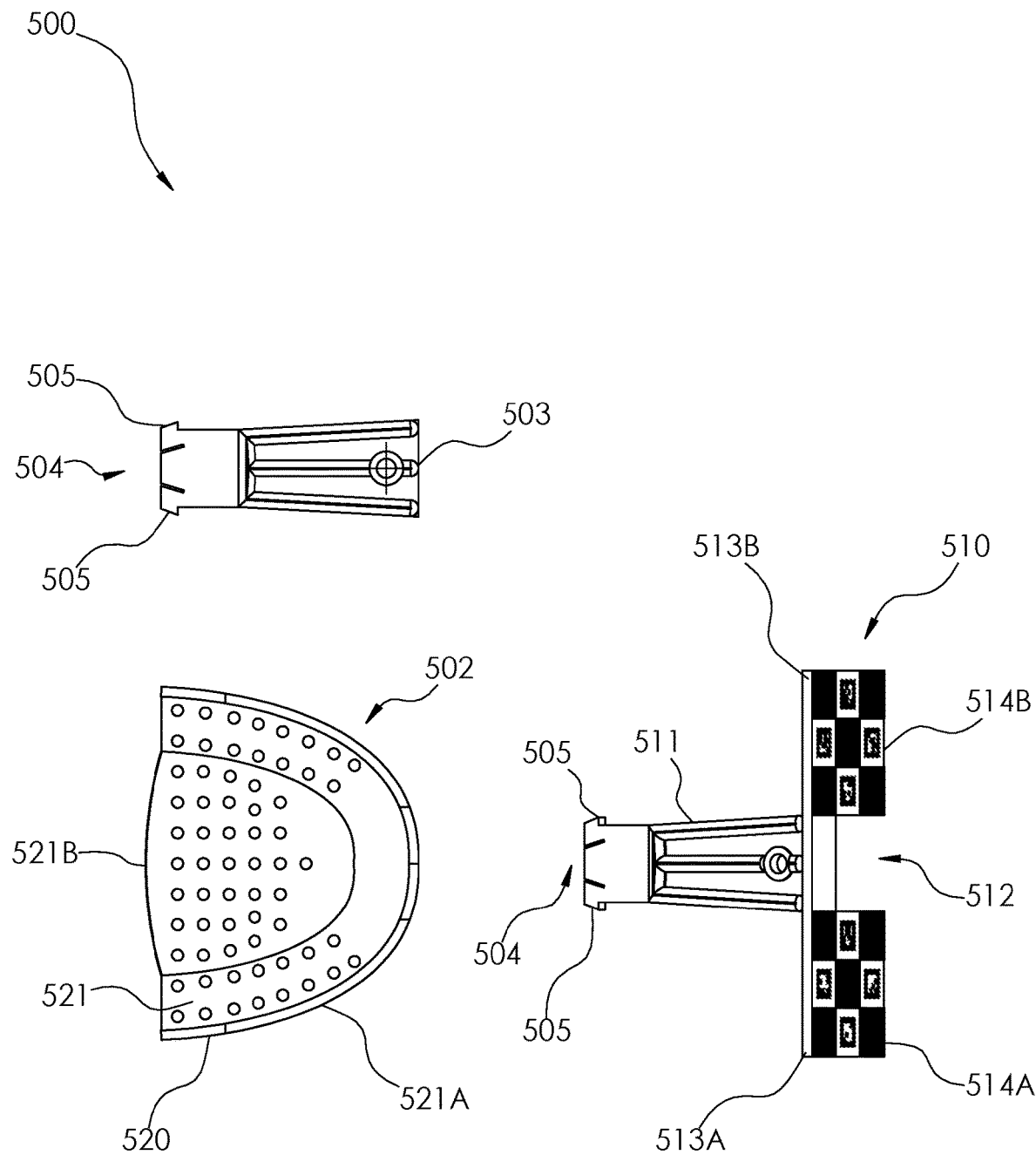
Figure 10C:
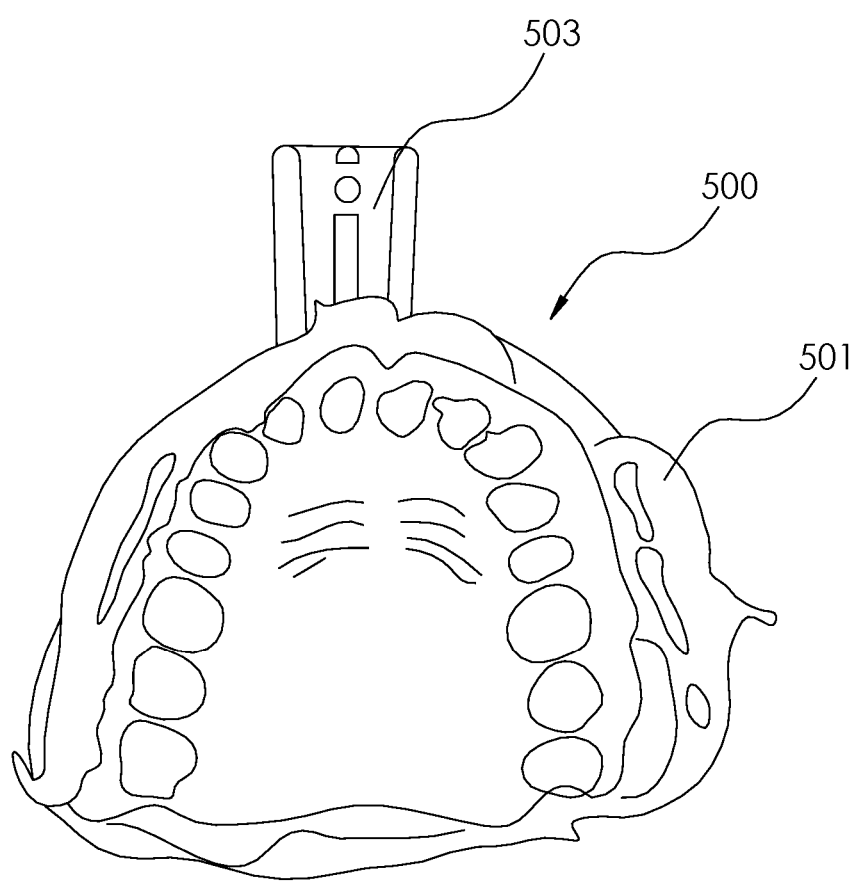
Figure 11:
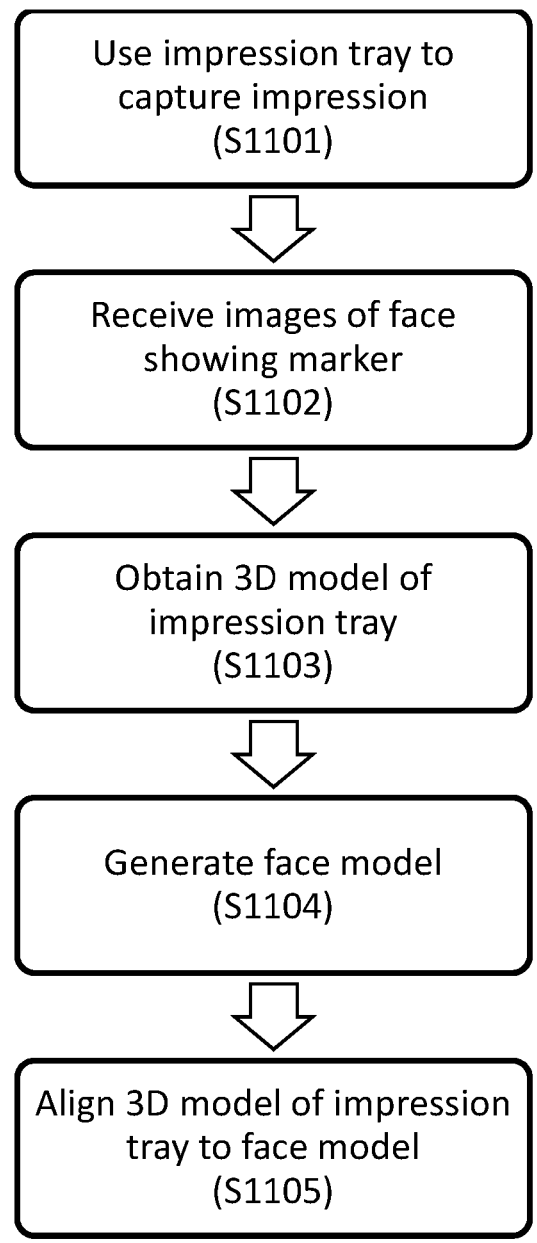
FIG. 11 is a schematic method of an example method of determining a spatial relationship between the upper teeth and the facial skeleton of a patient.

FIG. 10A-C show an example impression tray 500. The impression tray 500 comprises a body 520 defining a recess 521 shaped to retain an impression material 501. The impression tray 500 is configured for insertion into the mouth of the patient P, so as to capture an impression of the patient's upper teeth U in the impression material 501.

The impression tray 500 is configured to capture an impression that is suitable for use in restorative and/or orthodontic dentistry. In other words, the impression captured by the tray 500 is of suitable quality that it can be used in the planning of treatments, including the design of crowns, bridges, implants, orthodontics and the like. Accordingly, the recess 521 may be sized to retain a sufficient volume of impression material 501 to capture an impression for use in restorative and/or orthodontic dentistry.

The recess 521 may be sized to capture a full-arch impression—i.e. an impression that captures all of the patient's upper teeth U. In other words, the recess 521 may substantially correspond in general shape to the arch of a patient's teeth, thus appearing approximately semi-circular in plan view. The recess 521 may be defined by a peripheral front wall 521a of the tray 500. The recess 521 may also comprise a raised central portion 521b, which accommodates the patient's tongue in use.

Furthermore, the impression tray 500 may be configured to capture an impression of only the patient's upper teeth U in the impression material 501. In other words, in some examples the impression tray 500 is not a double-sided tray, but instead is a single-sided tray. This is in contrast to a shallow "bite impression" trays that are used to simultaneously capture quick, partial impressions of the upper and lower front teeth, and which do not result in impressions that are suitable for use in restorative dentistry.

A front region 502 of the impression tray body 520 comprises a receiving portion, such as a socket (not shown) configured to receive a handle. FIG. 10B-C show a conventional handle 503. In use, the handle 503 projects forward from the mouth of the patient P.

FIGS. 10A-B show an example marker handle 510, which is insertable in the socket in place of the conventional handle 503. The marker handle 510 comprises a handle body 511 arranged to project from the tray body 520, and a marker portion 512. In one example, the marker portion 512 is disposed at an end of the handle body 511 most distal from the tray body 520. The handles 503, 510 each comprise an attachment portion 504 for attaching the handle to the body.

For example, the attachment portion 504 comprises resiliently flexible portions 505 for securing the handle in the socket.

The marker portion 512 comprises a plurality of marker sections 513. For example, the marker portion may comprise a pair of marker section 513A,B, extending laterally from opposing sides of the handle body 511. The marker sections 513 may each comprise a planar section, which may be oriented generally orthogonally to the direction in which the handle body 511 extends. Accordingly, the marker sections 513 provide a planar surface that is in a substantially vertical plane when the impression tray 500 is disposed in the mouth of the patient P. Each marker section 513 comprise a marker 514. For example, the marker 514 comprises a plurality of distinctive patterns and/or colours.

An example method employing the impression tray 500 with marker handle 510 will now be discussed with reference to FIG. 11.

In block S1101, an impression of the patient's upper teeth U is captured using the impression tray 500 with the marker handle 510 attached thereto. In more detail, impression material 501 is inserted into the recess 521 of the tray body 520, and the marker handle 510 is attached to the socket. The impression tray 500 is then inserted into the mouth, such that the markers 514A,B are in a generally vertical plane and visible in front of the mouth.

In block S1102, a plurality of images of the patient's face are received, wherein the images show the marker handle in the position discussed above. For example, a plurality of images may be captured in the manner described hereinabove with respect to FIG. 2, whilst the impression is being taken of the patient's upper teeth U using the tray 500. In one example, a dentist may support the impression tray in position as the impression material sets in the mouth, whilst a dental assistant captures the images. The dentist may control the capture of the impression, rather than allowing the patient to bite down, ensuring that a high-quality impression is taken.

In block S1103, a 3D model is obtained of the assembly of the impression tray 500 used in block S1001, including marker handle 510. In one example, the 3D model is a colour 3D model. The model may be obtained using the 3D scanner discussed hereinabove.

In block S1104, a face model is generated. For example, the model may be generated as discussed herein with respect to FIG. 1-8.

In block S1105, the 3D model of the impression tray 500 is aligned to the face model. The alignment may be carried out substantially as discussed hereinabove. However, instead of aligning a 3D model of the upper teeth to the facial model based on images showing at least a part of the upper teeth, the 3D model of the impression tray is aligned to the images based on the markers 514A, B. In other words, the position of the marker shown in each of the images allows an optimal alignment to be derived between the facial model and the markers, and consequently the remainder of the impression tray 500 including the impression of the user's upper teeth U. Accordingly, an alignment between the upper teeth of the patient and the facial skeleton is derived.

In some examples, separate sets of captured images may be used for the generation of the face model and the alignment of the 3D model of the impression tray to the face model. However, in other examples, a single set of images (e.g. a single video) may be used in the generation of the 3D model of the face and the subsequent alignment of the impression tray 500 to the face model.

Whilst the markers 514 are shown as a pattern of blocks similar to a QR code, it will be appreciated that different patterns or arrangements may be employed, in order to provide visually distinctive features that can be readily identified in the images. Furthermore, whilst two markers 514A,B are shown in FIG. 9, it will be appreciated that more or fewer markers may be displayed. Whilst the markers 514 are displayed on a planar surface, it will be understood that in further examples, curved markers may be employed. The curved markers may be curved around the face of the user. The curved markers may be elongate, so as to give a whisker-like appearance.

In addition, whilst in the example of FIG. 9 the impression tray 500 the marker handle 510 is attachable to a socket in the tray body 520, in further examples the impression tray and handle may be integrally formed.

In a further example, a 3D model may be obtained of the impression tray body 520 without the marker handle 520. Particularly, the spatial relationship between the markers 514 A,B of the handle 520 and the tray body 520 may be known in advance, for example by virtue of the fact that the handle 510 is of a predetermined size and shape, and thus has a predetermined spatial relationship with respect to the tray body 520. Accordingly, by aligning the markers 514 A,B to the facial skeleton (e.g. based on images of the markers or a separate 3D scan of the marker handle 510), the position of the impression tray body 520 can be inferred based on the predetermined spatial relationship. This may facilitate the use of 3D dental scanners that can accommodate the impression tray body 520 but not the handle 510.

Advantageously, the above-described systems and methods provide a method of determining the alignment of the upper teeth and facial skeleton, which avoids the need for the use of a facebow, and instead relies on video footage captured for example via a mobile phone camera. Accordingly, an easier-to-operate and cheaper solution is provided, which takes advantage of the availability of a high-quality 3D model of the upper teeth.

Advantageously, the systems and methods involving the impression tray may provide a robust solution that eases 2D-3D alignment based on distinctive markers. Furthermore, the capture of a high-quality, full-arch impression suitable for use in restorative and/or orthodontic dentistry and 2D images showing the markers may occur concurrently, advantageously fitting in with a typical dental workflow.

At least some of the examples described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some examples, the described elements may be configured to reside on a tangible, persistent, addressable storage medium and may be configured to execute on one or more processors. These functional elements may in some examples include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example examples have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example may be combined with features of any other example, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A computer-implemented method comprising:
   receiving a 3D model representative of upper teeth of a patient;
   receiving a plurality of images of a face of the patient;
   generating a facial model of the patient based on the received plurality of images;
   determining, based on the determined facial model, the received 3D model of the upper teeth and the plurality of images, a spatial relationship between the upper teeth of the patient and a facial skeleton of the patient.

2. The method of claim 1, wherein determining the spatial relationship between the upper teeth and the facial skeleton comprises:
   determining a camera pose with respect to the facial model, and
   determining optimal alignment of the images to the 3D model representative of the upper teeth based on the camera pose.

3. The method of claim 2, wherein the plurality of images of the face of the patient are a plurality of 2D images, further wherein determining the optimal alignment comprises, for each of the plurality of 2D images:
   rendering a 3D scene based on a current estimate of a camera pose at which the image was captured and an estimated spatial relationship between the 3D model representative of the upper teeth and the facial model;
   extracting a 2D rendering from the rendered 3D scene based on the current estimate of the camera pose; and
   comparing the 2D rendering to the image to determine a cost score indicative of a level of difference between the 2D rendering and the image.

4. The method of claim 3, comprising using a non-linear optimiser to iteratively obtain the optimal alignment over the images, wherein the cost score comprises a mutual information score calculated between the rendering and the image.

5. The method of claim 4, wherein the cost scores used in each iteration by the optimiser differ.

6. The method of claim 3, wherein the cost score comprises a similarity score of corresponding image features extracted from the rendering and the image, wherein the image features are corner features, edge features or image gradient features, and wherein the similarity score is one of Euclidian distance, random sampling or one-to-oneness.

7. The method of claim 3, wherein the cost score comprises a 2d-3d-2d-2d cost, calculated by:
   extracting 2D image features from the rendered 3D scene;
   re-projecting the extracted features on to the rendered 3D scene;
   extracting image features from the 2D image;
   re-projecting the extracted features from the 2D image onto the rendered 3D scene, and
   calculating a similarity measure indicative of the difference between the re-projected features in 3D space.

8. The method of claim 3, wherein the cost score comprises an optical flow cost, calculated by tracking pixels between consecutive images of the plurality of 2D images; and wherein the method further comprises determining a plurality of different cost scores based on different extracted features and/or similarity measures.

9. The method of claim 2, wherein the facial model is a 3D morphable mesh, and wherein generating the facial model comprises:
   detecting a plurality of facial landmarks from the images, and
   fitting the 3D morphable mesh to the facial landmarks; wherein the 3D morphable mesh comprises a hole at a position corresponding to the mouth of the patient.

10. The method of claim 9, wherein determining the camera pose of an image of the plurality of images comprises:
    morphing the 3D morphable mesh to match an expression shown in the image, and determining the camera pose based on the morphed 3D morphable mesh.

11. The method of claim 1, wherein:
    the plurality of images comprise at least a portion of the upper teeth of the patient, and
    the 3D model representative of the upper teeth of the patient is a 3D model of the upper teeth of the patient.

12. The method of claim 1, wherein:
    the plurality of images comprise at least a portion of a marker, the marker being coupled to an impression tray disposed in a mouth of the patient, the marker being disposed outside the mouth of the patient; and
    the 3D model representative of the upper teeth is a 3D model of the impression tray.

13. The method of claim 12, wherein the 3D model of the impression tray includes the marker, or wherein the 3D model of the impression tray does not include the marker, and the spatial relationship between the teeth and the facial skeleton is determined based on a predetermined spatial relationship between the marker and the impression tray.

14. The method of claim 1, wherein the plurality of images comprise a first set of images and a second set of images, wherein:

the first set of images is used to generate the 3D model of the face, the second set of images each include at least a portion of the upper teeth of the patient or a marker, and are used to determine the spatial relationship between the upper teeth and the facial skeleton.

\* \* \* \* \*